(12) United States Patent
Jensen

(10) Patent No.: US 6,521,859 B2
(45) Date of Patent: Feb. 18, 2003

(54) SYSTEM AND METHOD FOR PRESERVING STORED FOODS

(75) Inventor: Lonald H. Jensen, Las Vegas, NV (US)

(73) Assignee: Nytrox 1, Inc., Las Vegas, NV (US)

( * ) Notice: Subject to any disclaimer, the term of this patent is extended or adjusted under 35 U.S.C. 154(b) by 170 days.

(21) Appl. No.: 09/735,031

(22) Filed: Dec. 12, 2000

(65) Prior Publication Data
US 2002/0070202 A1 Jun. 13, 2002

(51) Int. Cl.$^7$ ............................................... B23K 10/00
(52) U.S. Cl. ........................... 219/121.59; 219/121.52; 219/121.48; 422/186.15; 422/186.14; 422/186.12; 422/186.08
(58) Field of Search ........................ 219/121.59, 121.48, 219/121.52, 75; 315/111.31; 422/186.15, 186.19, 186.04, 186.09–186.13

(56) References Cited

U.S. PATENT DOCUMENTS

| | | | | |
|---|---|---|---|---|
| 4,167,466 A | * | 9/1979 | Orr, Jr. et al. | 204/176 |
| 4,954,321 A | * | 9/1990 | Jensen | 422/186.19 |
| 5,756,054 A | * | 5/1998 | Wong et al. | 422/186.08 |
| 5,977,715 A | * | 11/1999 | Li et al. | 315/111.51 |

* cited by examiner

*Primary Examiner*—Mark Paschall
(74) *Attorney, Agent, or Firm*—Jeffrey Weiss; Harry M. Weiss; Weiss, Moy & Harris, P.C.

(57) ABSTRACT

A system and method for preserving stored foods. The system and method utilizes an apparatus for generating ozone and other atoms and molecules resulting from the bombardment of a feed gas with electrons having, preferably, a first electrode positioned within a channel in a second electrode. The first electrode is a substantially sealed tube made of dielectric material, having at least one electron gun positioned proximate an end for firing electrons into the first electrode. In electrical communication with the electron gun is a rod, maintained in a tube also made of dielectric material, which acts to maintain a constant energy level through the length of the rod and thus the length of the electrode. Within the first electrode is an inert gas which, upon the firing of the electron gun, is formed into a plasma. When a feed gas (generally air) is passed between the first and second electrodes, the electrons and plasma cause the formation of ozone and other atoms and molecules in the feed gas, which products have beneficial uses in the preservation of stored foods. The treated feed gas is then passed into a permanent or mobile food storage unit, such as a potato storage facility, having an appropriate temperature and humidity level, to achieve a sufficient concentration and for a sufficient period of time to be beneficial.

46 Claims, 5 Drawing Sheets

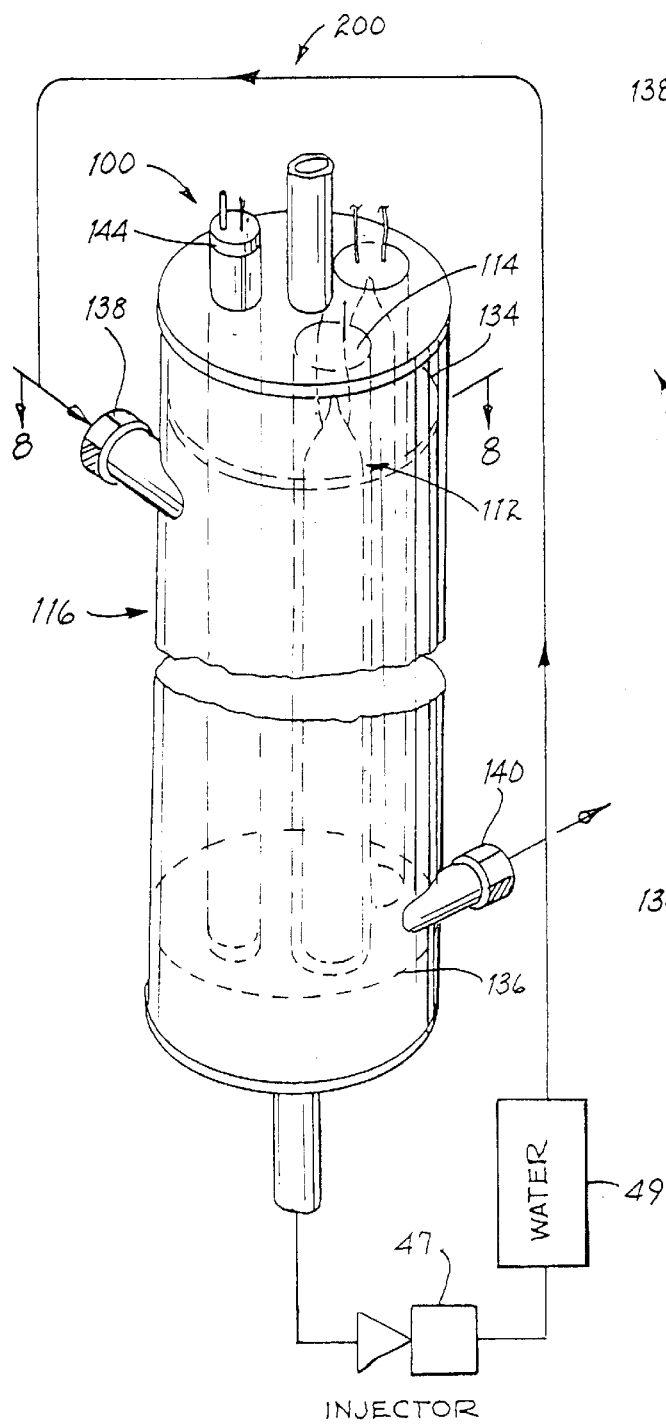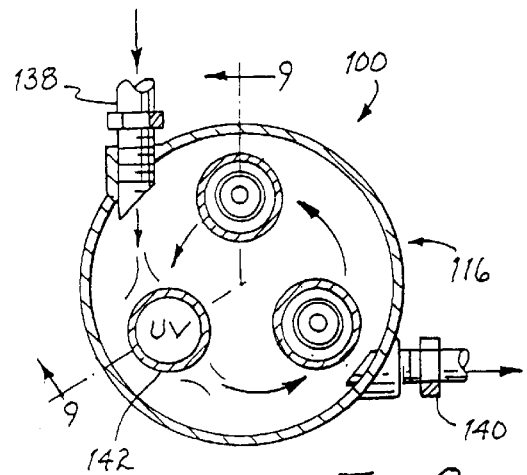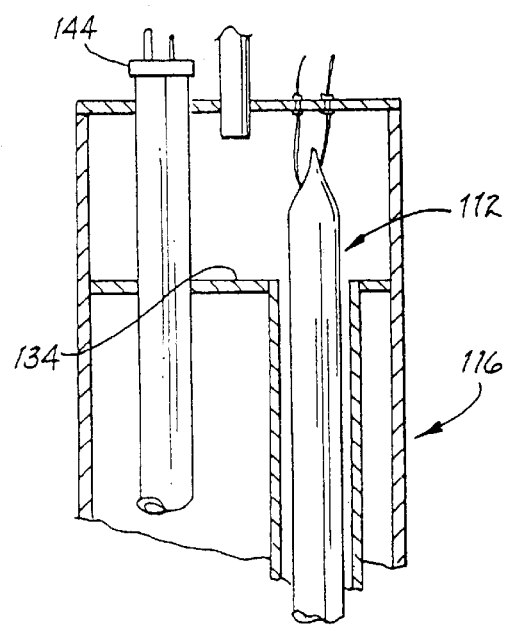
FIG. 7
FIG. 8
FIG. 9

SYSTEM AND METHOD FOR PRESERVING STORED FOODS

CROSS-REFERENCE TO RELATED APPLICATIONS

The contents of the following U.S. Patent Applications are hereby incorporated by reference: U.S. patent application Ser. No. 09/738,030, filed Dec. 18, 2000 and entitled "Apparatus and Method for Treating Drinking Water"; U.S. patent application Ser. No. 09/734,359, filed Dec. 12, 2000 and entitled "Apparatus and Method for Treating Irrigation Water"; U.S. patent application Ser. No. 09/734,369, filed Dec. 12, 2000 and entitled "Apparatus and Method for Treating Waste Water"; U.S. patent application Ser. No. 09/735,031, filed Dec. 12, 2000 and entitled "Apparatus and Method for Generating Ozone"; and U.S. patent application Ser. No. 09/734,368, filed Dec. 12, 2000 and entitled "Apparatus and Method for Treating Cooling Tower Water."

BACKGROUND OF THE INVENTION

1. Field of Invention

This invention relates generally to systems and methods for preserving stored foods and, more specifically, to a system and method for preserving stored foods utilizing a high concentration ozone generation apparatus.

2. Background of the Invention

The protection of food from damage caused by microbes, spores, insects and other similar sources is a major concern. Each year, economic losses of food and fiber due to damage from such sources is more than $122 billion. Currently, food items are preserved using a variety of methods, including fumigation with toxic chemicals, irradiation, biological control, heat exposure, and controlled atmosphere storage (a fruit industry technique that involves modifying the concentration of gases naturally present in the air). Certain of these methods, including for example fumigation and irradiation, carry risks for workers involved in the treatment and/or for consumers of the preserved food.

The use of ozone, an unstable molecule comprised of three atoms of oxygen ($O_3$) having a high oxidation potential, to purify water and air is well known. It was used to purify drinking water by the latter part of the 1800's, and today is used for this purpose by most major U.S. cities. Ozone has also been utilized for the purification of other types of water, including irrigation water, as well as waste water and cooling tower water.

The use of ozone as a microbicide and odor reducer is not, however, limited to the treatment of water. While ozone is highly water soluble and thus generally more effective in water, it can be used effectively in the air as well—attacking yeasts and fungi as well as bacteria. In this regard, for nearly a century, ozone has been used as a food preservation agent for a wide variety of perishable food items. Food items potentially preserved by ozonation include potatoes, eggs, cheeses, bananas, berries, meats, carrots, onions, and peaches. (Ozone dissolved in water has also been used in food storage—including for the preservation of fish in ozonated ice.)

The basic principles underlying the use of ozone generation are well established. Clean, dry air consists of approximately 78 percent nitrogen gas ($N_2$), approximately 21 percent oxygen gas ($O_2$) and less than one percent of hydrogen ($H_2$) and other gasses. When air (referred to as the "feed gas" in this context) is irradiated using either an ultraviolet source or corona discharge (the acceleration of electrons between two electrodes, separated by a dielectric material, to collide with a feed gas passed therebetween), some of the $O_2$ molecules are split to form two short-lived oxygen atoms. These oxygen atoms combine, almost instantaneously, with uncleaved oxygen molecules to form ozone. Ozone and certain of the other atoms and molecules formed as a result of ozonation (including hydrogen peroxide and hydroxyl radicals) have a number of beneficial uses in the areas of disinfection and odor elimination—and for this reason are useful in preserving foods.

Ultraviolet radiation is disfavored as a method for generating ozone, due to the inability to produce high quantities of ozone at a relatively low cost in this fashion. As a result, most commercial ozone production is accomplished using a corona discharge type of ozone generator.

However, there are numerous problems with prior art corona discharge ozone generators, and thus limitations on their suitability for use in a system and method for preserving stored foods. Thus, when the feed gas is passed between the electrodes, water or dust present in the feed gas attach themselves to the dielectric surrounding the cathode. These spots tend to attract electrons, with the result that hot spots are formed on the surface of the dielectric—leading eventually to the burning through of the dielectric and consequent failure of the generation apparatus. In the commercial area, ozone generators require constant servicing and, indeed, rebuilding, because of such problems. In the City of Los Angeles, for example, high concentration ozone generators used to treat the city's drinking water are presently required to be rebuilt after approximately ten days of use—a rate that is plainly undesirable. Moreover, prior art devices do not permit the ready manipulation of the ozonation products, for example to produce more ozone and less nitrogen-containing compounds as is particularly beneficial for the preservation of stored foods.

U.S. Pat. No. 4,954,321, issued to the applicant herein, illustrates a plasma corona discharge apparatus, representing an improvement upon the basic corona discharge process. Generally, a plasma corona discharge apparatus is similar to a non-plasma apparatus, except that in a plasma apparatus, an inert gas is inserted into an elongated, insulated, sealed cathode, into which electrons are fired for the ozonation process. That gas performs two functions. First, it generally precludes the formation of hot spots and resulting dielectric burn-through and generator failure through a convection process. In this regard, the inert gas, which has become a plasma by virtue of the electrons passing therethrough, becomes attracted to a water or dust spot, the gas becomes heated and then rises away from the hot spot, to be replaced by gas having a lower temperature. This results in a relatively constant movement of the gas and substantially reduces overheating and/or apparatus failure attributable to the formation of stable hot spots.

The second function of the inert gas is to directly assist in the efficiency of the ozonation process. In this regard, upon the firing of electrons from an electron gun into the inert gas, a plasma is formed within the cathode (i.e., on the inside of the dielectric), and also outside of the dielectric. The passage of electrons though this plasma and into the feed gas causes oxygen disassociation and reformation as ozone at an improved rate over non-plasma devices.

However, even the plasma device illustrated in U.S. Pat. No. 4,954,321, while more reliable than prior art devices, suffers from important limitations and deficiencies. For example, the energy produced by the electron gun firing into the cathode is concentrated near the electron gun, and gradually dissipates over the length of the electrode. This results in a decrease in the effectiveness of this particular prior art apparatus in treating the feed gas, and thus in the production of a lower concentration of ozone than is possible if the energy level could be maintained constant throughout the length of the cathode.

A need therefore existed for an improved system and method for preserving stored foods, preferably based on an ozone generator apparatus and method capable of reliably generating high concentrations of ozone (and other ozonation products) suitable for use in such treatment. The improved system and method should provide for the maintenance of a relatively constant energy level throughout the length of the energy-producing electrode, so as to provide more efficient production of ozonation products. The improved system and method should also provide for the efficient adjustment of the products of ozonation, so that ozone and other oxidizing products can be favored. The improved system and method should not adversely affect the taste of the treated food product, and should not create any harmful byproducts. The present invention satisfies these needs and provides other, related, advantages.

SUMMARY OF THE INVENTION

It is an object of the present invention to provide an improved system and method for preserving stored foods with ozone and other atoms and molecules formed from the bombardment of a feed gas with electrons.

It is an object of this invention to provide an improved system and method for preserving stored foods with ozone and other atoms and molecules formed from the bombardment of a feed gas with electrons, wherein the system and method have a reduced risk of failure as compared to prior art systems and method based on corona discharge apparatuses.

It is a further object of this invention to provide an improved system and method for preserving stored foods with ozone and other atoms and molecules formed from the bombardment of a feed gas with electrons capable of producing a higher concentration of ozone than prior art systems and methods based on corona discharge apparatuses by, among other things, providing for a substantially constant energy level throughout the length of the first electrode in the apparatus used in the system and method of the present invention.

It is a still further object of this invention to provide an improved system and method for preserving stored foods with ozone and other atoms and molecules formed from the bombardment of a feed gas with electrons which system and method may be readily adjusted to alter the relative quantities of atoms and molecules produced from the bombardment, so as to produce fewer nitrogen containing compounds and greater quantities of ozone and other oxidizers.

BRIEF DESCRIPTION OF THE PREFERRED EMBODIMENTS

In accordance with one embodiment of the present invention, a system for preserving stored foods is disclosed. The system comprises, in combination: an apparatus for bombarding a feed gas with electrons to generate ozone and other atoms and molecules comprising: a first electrode; wherein said first electrode comprises: an electron gun coupled to a power source and located proximate one end of said first electrode; a rod in electrical communication with said electron gun; a first tube of dielectric material disposed along a length of said rod; a second tube of dielectric material dimensioned to receive therein said first tube; wherein said second tube is substantially sealed; and an inert gas disposed within each of said first tube and said second tube; a second electrode containing a channel dimensioned to receive therein said first electrode so that sufficient space is present between said first electrode and said second electrode that a feed gas may be passed through said channel along an exterior surface of said first electrode; a feed gas inlet coupled to said second electrode and wherein said feed gas inlet is in communication with said channel; and a feed gas outlet coupled at a first end thereof to said second electrode and wherein said feed gas outlet is in communication with said channel; means coupled to said feed gas outlet for transporting said feed gas to a food storage area.

In accordance with another embodiment of the present invention, a system for preserving stored foods is disclosed. The system comprises, in combination: an apparatus for bombarding a feed gas with electrons to generate ozone and other atoms and molecules comprising: a first electrode comprising a substantially sealed tube of dielectric material; wherein said first electrode further comprises: a first electron gun coupled to a power source, located proximate one end of said first electrode, and adapted to fire electrons into said substantially sealed tube of dielectric material; a second electron gun coupled to a power source, located proximate a second end of said first electrode, and adapted to fire electrons into said substantially sealed tube of dielectric material; and an inert gas disposed within said substantially sealed tube of dielectric material; a second electrode containing a channel dimensioned to receive therein said first electrode so that sufficient space is present between said first electrode and said second electrode that a feed gas may be passed through said channel along an exterior surface of said first electrode; a feed gas inlet coupled to said second electrode and wherein said feed gas inlet is in communication with said channel; and a feed gas outlet coupled at a first end thereof to said second electrode and wherein said feed gas outlet is in communication with said channel; and means coupled to said feed gas outlet for transporting said feed gas to a food storage area.

In accordance with still another embodiment of the present invention, a method for preserving stored foods is disclosed. The method comprises the steps of: providing an apparatus for bombarding a feed gas with electrons to generate ozone and other atoms and molecules comprising: a first electrode; wherein said first electrode comprises: an electron gun coupled to a power source and located proximate one end of said first electrode; a rod in electrical communication with said electron gun; a first tube of dielectric material disposed along a length of said rod; a second tube of dielectric material dimensioned to receive therein said first tube; wherein said second tube is substantially sealed; and an inert gas disposed within each of said first tube and said second tube; a second electrode containing a channel dimensioned to receive therein said first electrode so that sufficient space is present between said first electrode and said second electrode that a feed gas may be passed through said channel along an exterior surface of said first electrode; a feed gas inlet coupled to said second electrode and wherein said feed gas inlet is in communication with said channel; and a feed gas outlet coupled at a first end thereof to said second electrode and wherein said feed gas outlet is in communication with said channel; providing means coupled to said feed gas outlet for transporting said feed gas to a food storage area; providing power from said power source to said electron gun; passing a feed gas into said feed gas inlet, through said channel, and out of said feed gas outlet; transporting said feed gas through said means to said food storage area.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 7 is a perspective, cut-away view of another embodiment of the apparatus utilized in the system and method of the present invention, having an ultraviolet light source.

FIG. 8 is a top, cross-sectional view of the apparatus of FIG. 7, taken along line 8—8.

FIG. 9 is a side view of the apparatus of FIG. 7, taken along line 9—9 of FIG. 8.

DETAILED DESCRIPTION OF THE PREFERRED EMBODIMENTS

Figure 1:
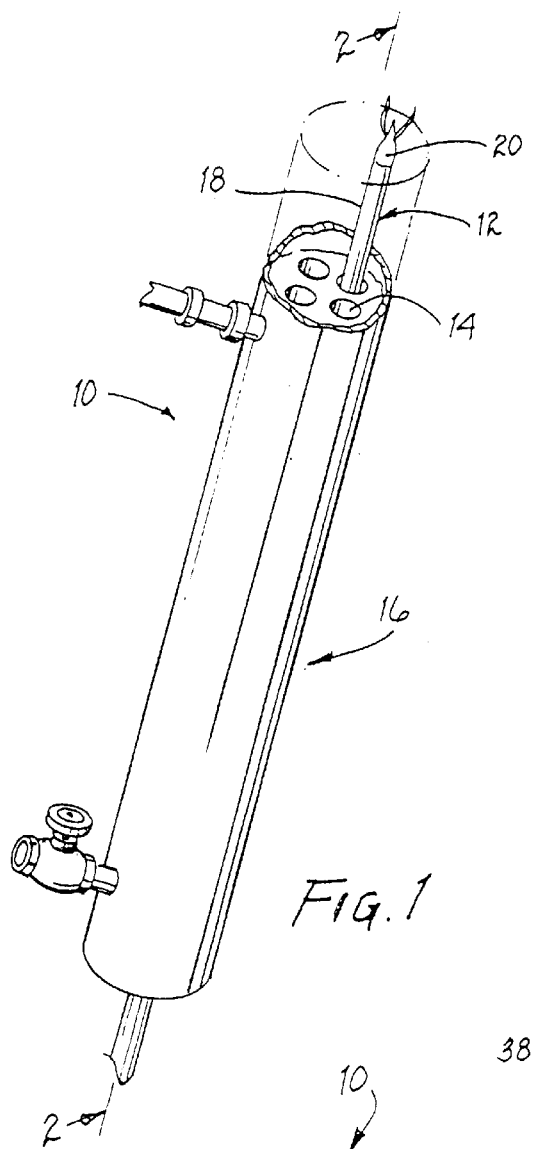
FIG. 1 is a perspective view of one embodiment of an ozone generation apparatus utilized in the system and method of the present invention.

When treating a food storage unit using ozone and other oxidizers produced in a feed gas using an ozone generator, the main purpose is to kill microbes and reduce odors.

In this regard, ozone, an electron deficient molecule, is a very powerful oxidizing agent (i.e., a chemical species that gains electrons during a chemical reaction.) The oxidation potential of ozone follows only that of flourine, atomic oxygen and hydroxyl radicals, and substantially exceeds that of chlorine, a chemical widely used in water treatment. (Flourine and atomic oxygen are not routinely used as oxidants. While hydroxyl radicals are also not routinely put to such use, they are not—unlike Flourine, for example—unduly dangerous for such use and a process that creates sufficient hydroxyl radicals for use in a treatment process would be highly beneficial.)

Ozone possesses other qualities that can make it preferable to chemicals commonly used to treat food storage facilities. First, ozone does not lead to the formation of any toxic, foul tasting or otherwise undesirable reaction byproducts that need to be removed before consumption of the food product, with any unused ozone quickly reverting back to oxygen gas ($O_2$).

Still further advantages associated with ozone versus other treatment chemicals include that ozonation generally requires a shorter reaction time than other treatment chemicals. Because of its highly unstable nature, ozone quickly reverts back to oxygen. Thus, the ozone will quickly enter the food storage area, react, and revert back to oxygen.

Unlike most chemicals used for treating stored foods, ozone cannot be packaged or stored. It also decomposes relatively quickly in the air. Therefore, ozone that is to be used in treating stored foods must be generated on site and used immediately. This can be both a disadvantage and an advantage. On the one hand, the use of ozonation requires the maintenance of an ozone generation capability at the food storage site, something not required with other treatments. On the other hand, the need to transport potentially dangerous chemicals and the risks associated with such transportation are eliminated.

Because ozone is a much more effective microbicide in water than in air, it must be used in much higher concentrations in air to be effective. In fact, low ozone concentrations in the air can encourage rather than limit bacterial growth. Relatedly, ozone is more effective in humid air than it is in dry air, although it also decomposes faster in such conditions. The optimum humidity level for ozonation is in the range of approximately 90 to 95%, although other levels may be more beneficial depending on the particular food stored, temperature, and other factors. At this humidity level, ozone effectively controls microorgranism growth, without causing fruit or other foods to shrink.

Temperature is another important variable when ozone is used in the air. Decomposition of ozone increases with increases in temperature, so that a colder temperature is favored. Accordingly, a preferred storage environment for ozone preservation is generally one with a relatively low temperature and a relatively high humidity level.

It is also necessary to package the stored foods in such a way so as to allow the ready circulation of the ozonated air—so as to maximize the efficiency of the treatment. Still further, so as to minimize potential damage to the interior of the storage facility from the introduction of ozone, ducts and piping should be constructed of aluminum or stainless steel, and sealing materials on doors and windows should be of ozone-resistant materials.

The optimal ozone concentration vary from food to food. For example, eggs, cheeses, and freshly sliced beef require ozone levels below one part per million ("ppm") to prevent mold growth. Strawberries, raspberries, currants, and sweet wine grapes require ozone concentrations of two to three ppm.

The use of ozone as a food preservation agent can be particularly effective with potatoes. (The State of Idaho alone has more than 35,000 large-size storage facilities for harvested potatoes.) Yet potatoes are vulnerable to degradation in storage, from bacteria and spores such as silverscerf and soft rote. Also, a variety of undesirable odors can develop in storage, causing further potential harm to the marketability of the product. The effective treatment of a potato storage facility for the killing of microbes and the reduction of odors generally requires the injection into the facility of sufficient ozone to achieve a concentration of eight ppm.

Ozonation as a method of treating stored foods can be used alone or in combination with one or more other treatment methods (and/or the ozonation treatment can be performed more than one time) to achieve optimal results. Moreover, although ozonation in food storage will generally involve the use of ozone in the air as discussed herein, it also may be possible to use ozonated water as a food preservation agent as well. Examples include the washing of chicken parts in ozonated water, or the storage of fish in ozonated ice. With respect to fish, studies have shown that the normal four to five day storage period for Alaskan salmon can be extended by about 50% by storing the fish under ice made from ozonated freshwater.

It should be noted that the improved corona discharge process of the present invention also produces in the feed gas a number of nitrogen containing compounds. These compounds, while potentially useful for purposes unrelated to the treatment of stored foods, are generally undesired for this purpose. Accordingly, it is appropriate, to the extent possible, to minimize the production of such compounds when using ozone in food storage.

Turning to the apparatus 10 preferably to be used for treating stored foods, it comprises, generally, at least one and preferably a plurality of electrodes 12 maintained in channels 14 within an anode 16. The electrodes 12, in turn, comprise an outer sealed tube 18, made of a dielectric material and substantially hermetically sealed. The material of the outer sealed tube 18 is preferably leaded glass or pyrex, although other dielectric materials could be used without departing from the spirit or scope of the present invention. At an upper portion of the outer sealed tube 18 is positioned an electron gun 20. The electron gun 20 may be of any desired size and of any type having the desired output. Preferably, the electron gun 20 is of the Philips TC series, and preferably is a Philips T19C, having a diameter of 19 mm. The Philips TC series is preferred for the electron gun 20 because of the presence at a bottom portion thereof of a ceramic ring 22, which ceramic ring 22 is able to better withstand the significant heat or sputtering created at the bottom portion of the electron gun 20 during operation of the apparatus 10—heat that otherwise could be sufficient to cause damage to the electron gun 20 through sputtering over time.

Each electron gun 20 is coupled to a power source 24. The power source may have any desired voltage consistent with the use to which the apparatus 10 is to be placed. Generally, the power source 24 should have a voltage of at least 1,000 volts, with a voltage of 10,250 preferred. During operation, and because the electrode 12 acts as a capacitor when electricity is passed therethrough, secondary voltage discharges in the range of approximately 100,000 volts are produced. Because of the occurrence of such secondary discharges, the power source 24 should be non-current limited so as to prevent failure during the occurrence of a secondary discharge.

Figure 4:
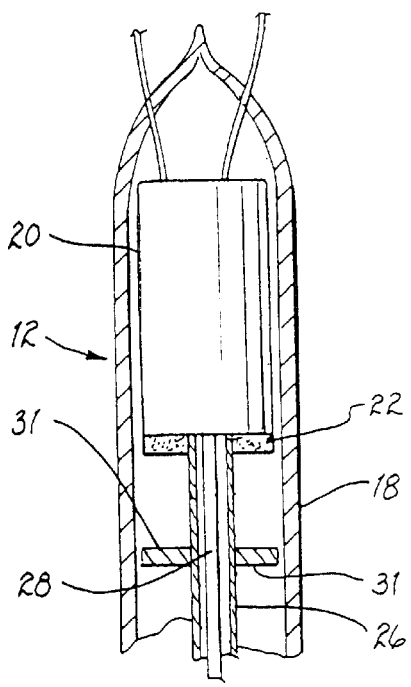
FIG. 4 is a side cross-sectional view of the first electrode in an embodiment of an ozone generation apparatus utilized in the system and method of the present invention, illustrating a configuration in which there is no gap between the rod and the electron gun.
Figure 4:
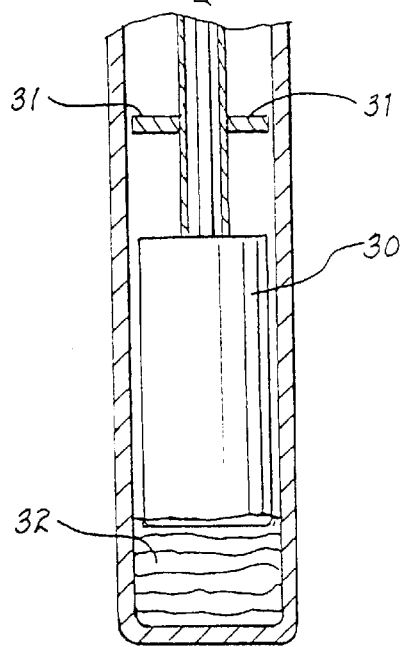
Figure 5:
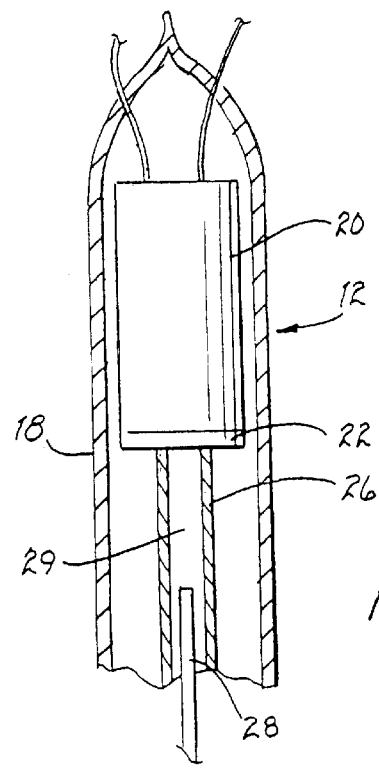
FIG. 5 is a side cross-sectional view of the first electrode in an embodiment of an ozone generation apparatus utilized in the system and method of the present invention, illustrating a configuration in which there is a gap between the rod and the electron gun.
Figure 6:
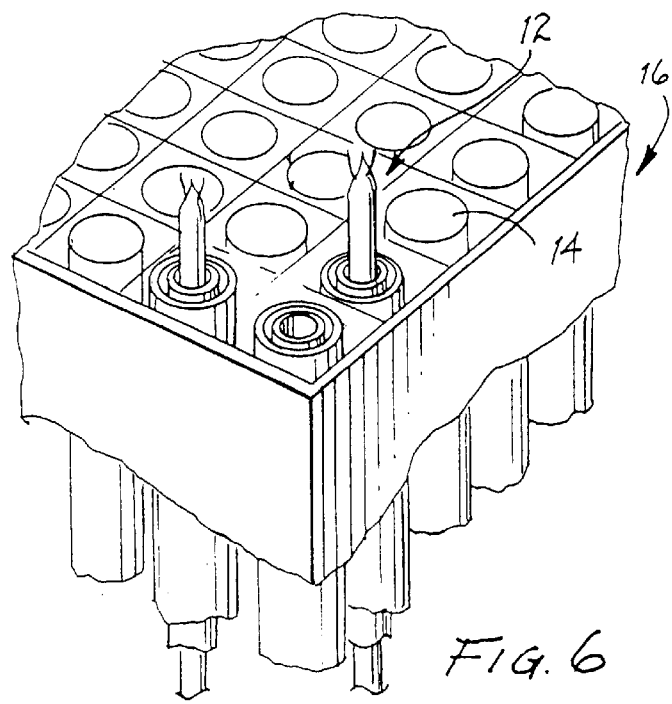
FIG. 6 is a perspective view of another embodiment of an ozone generation apparatus utilized in the system and method of the present invention, illustrating a configuration having numerous first electrodes.

Referring specifically to FIGS. 4–5, inserted into the electron gun 20 is an inner tube 26, also made of a dielectric material. Like the outer sealed tube 18, the inner tube 26 is preferably made of leaded glass or pyrex, although other dielectric materials could be used without departing from the spirit or scope of the present invention. Positioned within the inner tube 26 is a rod 28. The rod 28 can be made of any metal, including aluminum, stainless steel or tungsten. Superior results have been obtained with aluminum. In one embodiment, the rod 28 extends into the electron gun 20. In the preferred embodiment, a gap 29 is created between the rod 28 and the electron gun 20. The purpose of the gap 29 is to create an increase in voltage from the power source 24—potentially more than a ten-fold increase—when the electricity jumps from the electron gun 20 to the rod 28. This increase in voltage results in an increase in the number of electrons generated and thus increases the efficiency of the ozonation process. Gaps of one-half inch and one inch have been shown to produce good results, although gaps of other lengths would be possible. Whether or not the gap 29 is present, the rod 28 maintains a substantially constant level of energy throughout its length.

Figure 10:
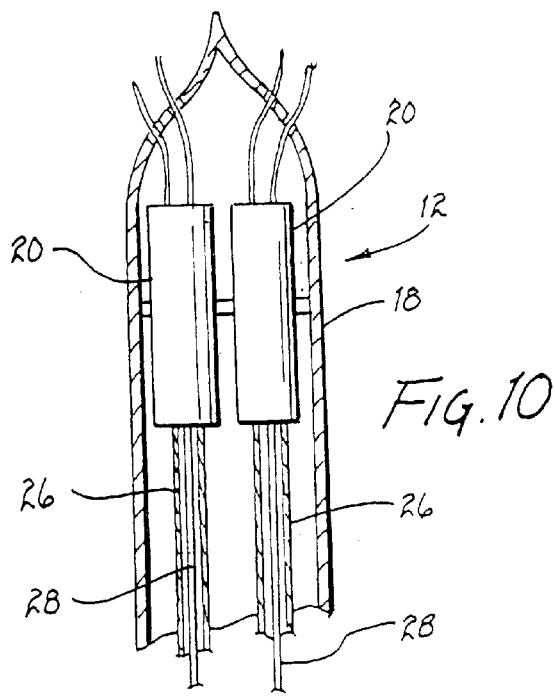
FIG. 10 is a side view of another embodiment of an electrode in the apparatus utilized in the system and method of the present invention, illustrating a plurality of electron guns.
Figure 12:
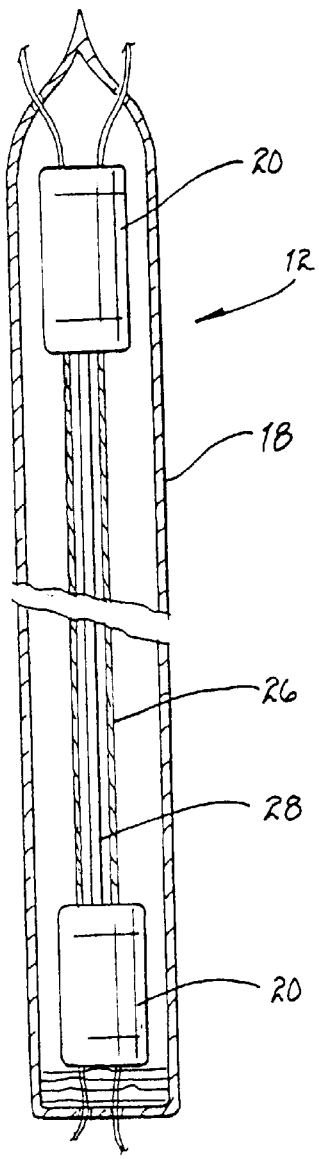
FIG. 12 is a side view of another embodiment of an electrode in the apparatus utilized in the system and method of the present invention, in which an electron gun is positioned on both ends of the electrode.
Figure 11:
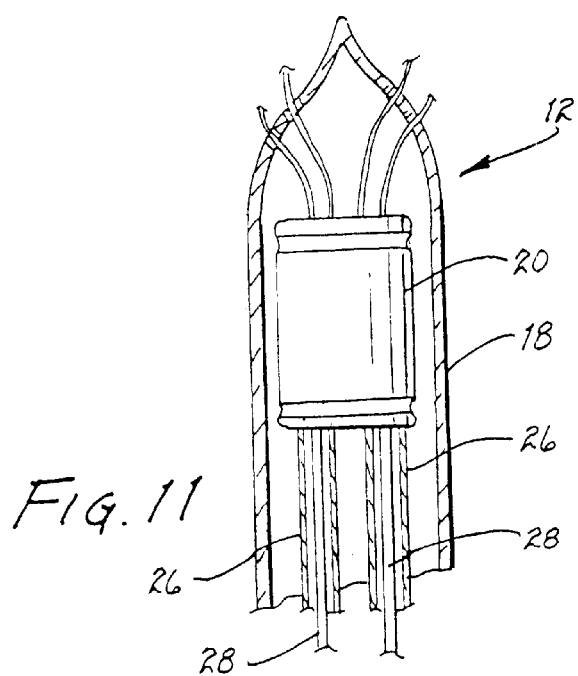
FIG. 11 is a side view of another embodiment of an electrode in the apparatus utilized in the system and method of the present invention, illustrating an electron gun having a plurality of rods therein.

It should be noted that while the electron gun 20 is preferably positioned within the outer sealed tube 18 at an upper portion thereof, it would be possible, without departing from the spirit or scope of the present invention, to position the electron gun 20 outside of the outer sealed tube 18. In such a configuration, the rod 28 and inner tube 26 would extend through a sealed opening in the outer sealed tube 18 so as to receive a flow of electrons from the electron gun 20. Moreover, and referring specifically to FIG. 12, while a single electron gun 20 positioned at a top portion of the electrode 12 is preferred, it would be possible to position an electrode 12 at a bottom portion of the electrode 12 at the other end of the rod 28—either in place of or in addition to the electron gun 20 positioned at the top of the electrode 12. Moreover, and referring now to FIG. 10, while a single electron gun 20 is shown in FIGS. 1, 2, 4 and 5, a plurality of electron guns 20 could be positioned at an end of the electrode 12 (or at both ends) to increase the output of the apparatus 10. (Indeed, the positioning of electron guns 20 at both ends of the electrode 12, even without the addition of the rod 28 and inner tube 26, would result in an increased yield over prior art devices.) Still further, and referring now to FIG. 11, with each electron gun 20 used, it would be possible to provide a plurality of rods 28. As shown in FIG. 11, each rod 28 could have its own inner tube 26 or, optionally, the rods 28 could be housed in a single inner tube 26.

The purpose of the inner tube 26 is prevent the creation of excess heat along the rod 28. But for the presence of the inner tube 26, heat generated by the rod 28 could burn through the outer sealed tube 18, causing the electrode 12 to fail.

The apparatus of the present invention improves upon the basic corona discharge process in a number of ways. These include the addition of the rod 28, which operates as discussed herein to allow for a substantially even amount of energy to be discharged throughout the length of the outer sealed tube 18. Without the rod 28, energy would be concentrated near the electron gun 20 and would gradually dissipate over the length of the electrode 12, reducing the effectiveness of the apparatus in treating the feed gas. Yet the addition of the rod 28 and the benefits that it confers is only made possible with the surrounding of the rod 28 with the inner tube 26—which acts to prevent the creation of excess heat along the rod 28. Still further, the use of an inert gas inside both the inner tube 26 and outer sealed tube 18, as described herein, acts as a coolant to prevent overheating of the electrode 12 during operation—substantially increasing the reliability and survivability of the apparatus 10 over prior art corona discharge ozone generators. Referring now to FIG. 4, in order to prevent the bottom of the inner tube 26 from contacting the bottom of the outer sealed tube 18 and thus causing arcing between the bottoms of the tubes 26 and 18 during operation of the electrode 12, a mini-tube 30 is preferably positioned around the bottom of the inner tube 26. The mini-tube 30, in combination with the electron gun 20, further acts to center the inner tube 26 throughout its length. (Preferably, additional centering—particularly where the electrode 12 is to be used in an angled generator—may be provided in the form of mica or other inserts 31 positioned between the inner tube 26 and the outer sealed tube 18.) The mini-tube 30 is also comprised of a dielectric material, including optionally ceramic, leaded glass, or pyrex. The mini-tube 30 is preferably open on both sides thereof. On the first side, it receives the inner tube 26. On the second side, it contacts a shock-absorber 32, which is positioned below the mini-tube 30, both to reduce the possibility of damage during movement of the electrode 12, particularly during insertion of the electrode 12 into a channel 14 in an anode 16, and to prevent the tubes 26 and 18 from contacting one another. The shock-absorbing material forming the shock-absorber 32 could be any desired material providing the desired shock-absorbing effect without interfering with the operation of the electrode 12, including for example fiberglass. It would be possible, without departing from the spirit or scope of the present invention, to eliminate the shock-absorber 32, and instead to close the second end of the mini-tube 30 so as to prevent the tubes 26 and 18 from contacting one another. As an additional alternative, it would be possible to seal the end of the inner tube 26 opposite the electron gun 20 and extend it to the bottom of the outer sealed tube 18.

Figure 2:
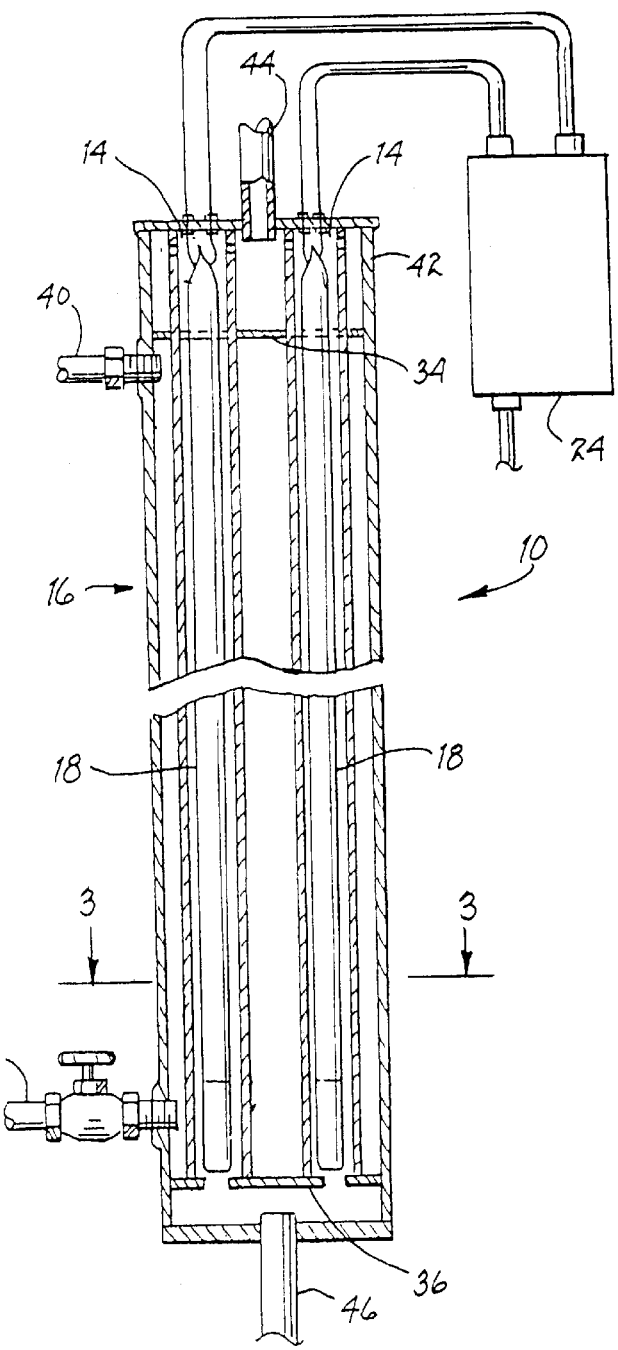
FIG. 2 is a side cross-sectional view of the apparatus of FIG. 1, taken along line 2—2.
Figure 3:
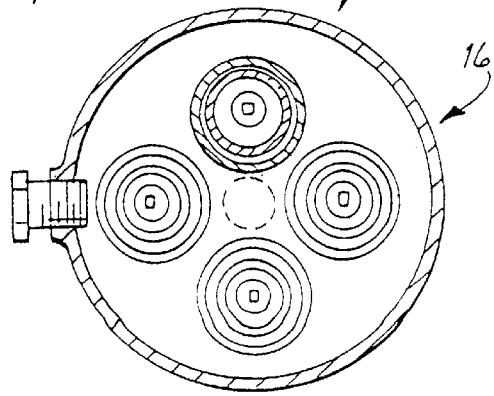
FIG. 3 is a top cross-sectional view of the apparatus of FIG. 1, taken along line 3—3 of FIG. 2.

Referring to FIG. 2, the electrode(s) 12 is dimensioned to be positioned within an anode 16, and specifically within a channel 14 in the anode 16. The channel 14 has a greater internal diameter than the external diameter of the electrode 12, so as to permit the air to be treated (the "feed gas") to pass through the channel 14 around the electrode 12. The channels 14 are positioned within the anode 16 with an upper plate 34 and a lower plate 36, so that the channels 14 open at a top portion thereof at the upper plate 34 and at a bottom portion thereof at the lower plate 36. The areas of contact between the channels 14 and the upper and lower plates 34 and 36 are preferably sealed against the passage of liquids, so as to permit the passage of a coolant between the upper and lower plates 34 and 36 and around the channels 14. The purpose of the coolant, in combination with the gasses contained in the electrodes 12 as discussed below, is to prevent overheating during operation of the electrodes 12. The coolant is preferably water—although other coolants, including for example glycol, may be used—and preferably enters the anode 16 through an inlet 38 proximate the lower plate 34 and exits the anode 16 through an outlet 40 proximate the upper plate 36.

The length of the anode 16 is preferably sufficient so that, when the electrodes 12 are positioned within the channels 14, the top, electron gun 20-containing portion of the electrode 12—which will extend above the upper plate 34—is within the outer wall 42 of the anode 16. The outer wall 42 should be of sufficient distance from the electrode 12 so as to prevent arcing between the two. A distance of approximately three inches is sufficient for certain applications.

Both the outer sealed tube 18 and the inner tube 26 have a substantially inert gas or gasses therein, including at least one noble gas. The gas acts as a coolant, by preventing through convection the overheating of the electrode 12 during operation and/or the damaging of the electrode 12 caused by electrons burning through the outer sealed tube 18. Because heated gasses will rise, the heat generated by the operation of the electrode 12 will tend to move away from a hot spot and rise along the electrode 12, until arriving at the portion of the electrode 12 positioned above the upper plate 34—an area that is maintained at a lower temperature than in the channels 14. The heated gas, which is formed into a plasma, will then cool and be replaced in this portion of the electrode 12 by hotter gasses, resulting in relatively constant movement of the gas and substantially reducing overheating and/or damaging of the electrode 12 during operation through the formation of stable hot spots.

This construction also allows the apparatus 10 of the present invention to operate at substantially higher temperatures than prior art high concentration ozone generators, without experiencing damage. (A high concentration ozone generator is generally considered to be one having an air output that contains at least approximately one percent by weight ozone.) While a typical prior art high concentration generator cannot be operated above approximately seventy-two degrees Fahrenheit, the apparatus 10 of the present invention can be operated at temperatures in the area of one hundred twenty five degrees Fahrenheit and perhaps greater without damage to the apparatus 10.

The reduction of overheating and damage to the electrode 12 provides substantial benefit over prior art high concentration ozone generators. Prior art generators have an extremely poor survival rate—requiring repair and/or rebuilding on a frequent basis. In the City of Los Angeles, for example, high concentration ozone generators used to treat the city's drinking water are required to be rebuilt approximately after only ten days of use—a rate that is plainly undesirable. The apparatus 10 of the present invention, in contrast, does not require rebuilding after short periods of use—and thus is substantially more reliable and has substantially greater survivability than prior art high concentration generators.

Located in the anode 16, above the upper plate 36, is an air inlet valve 44. Preferably a filter (not shown) is located within the inlet valve 44, so as to prevent dirt and other impurities from entering the apparatus 10. A five micron filter has been shown to be effective, but other size filters may be provided. The air need not be provided under pressure but instead, may be drawn through the system through an air outlet valve 46 located below the lower plate 34. Alternatively, the air may be provided through the air inlet valve 44 under pressure. From the air outlet valve 46, the air is transported away from the apparatus 10 and is placed into a substantially sealed food storage unit 45 to be treated using the apparatus 10.

During operation, power is supplied to the electron guns 20 using the power source 24. Electrons will flow from the electron guns 20 to the rod 28, passing over the gap 29 in the embodiment shown in FIG. 5. The electrons will flow down the length of the rod 28, will jump from the rod 28 to the inner tube 26, will jump from the inner tube 26 to the outer sealed tube 18, and will jump from the outer sealed tube 18 to the wall of the channel 14; i.e., to ground. The use of the rod 28 allows the for a substantially even amount of energy to be discharged throughout the length of the outer sealed tube 18. Without the rod 28, energy would be concentrated near the electron gun 20 and would gradually dissipate over the length of the electrode 12, reducing its effectiveness. The electrons passing out of the outer sealed tube 18 will act on the air passing through the channels 14, causing the air to disassociate and causing the production of a number of desirable products. These include but are not limited to nitrates, nitrites, nitrogen oxides, nitric acid, nitrogen based acids, hydrogen peroxide, hydroperoxide, ozone, and hydroxyl radicals (NO, $NO_2$, $NO_3$, $N_2O$, $N_2O_5$, $HNO_2$, $HNO_3$, O, $O_3$, H, OH, $HO_2$, $H_2O_2$). The ozonated air is then placed in a food storage unit.

The food storage unit can be a permanent storage facility such as a warehouse or silo, a mobile facility such as a container used for shipping, or any other unit used to store food.

The types of desirable products created during the operation 10 is subject to adjustment. Thus, as discussed above, a coolant, preferably water, is passed between the upper and lower plates 34 and 36 and around the channels 14 during operation of the apparatus 10—to prevent overhearing during operation of the electrodes 12. Additionally, depending on its temperature, the coolant acts to regulate the make-up of the products produced in the air as it passes through the channels 14. Thus, by adjusting the temperature of the coolant so that the temperature of the coolant as it exits through the outlet 40 is below ninety degrees Fahrenheit, with an exit temperature in the range of approximately eighty-five degrees Fahrenheit preferred, the production of nitrates and other nitrogen containing products can be decreased and the production of ozone and hydrogen peroxide can be increased. This will be the desired mode for the treatment of food storage units. (On the other hand, by adjusting the temperature of the coolant so that the temperature of the coolant as it exits through the outlet 14 is between approximately ninety degrees and one hundred and five degrees Fahrenheit, nitrate production (and the production of other nitrogen containing compounds) can be increased and the production of ozone and hydrogen peroxide can be decreased).

Operation of the System

Figure 13:
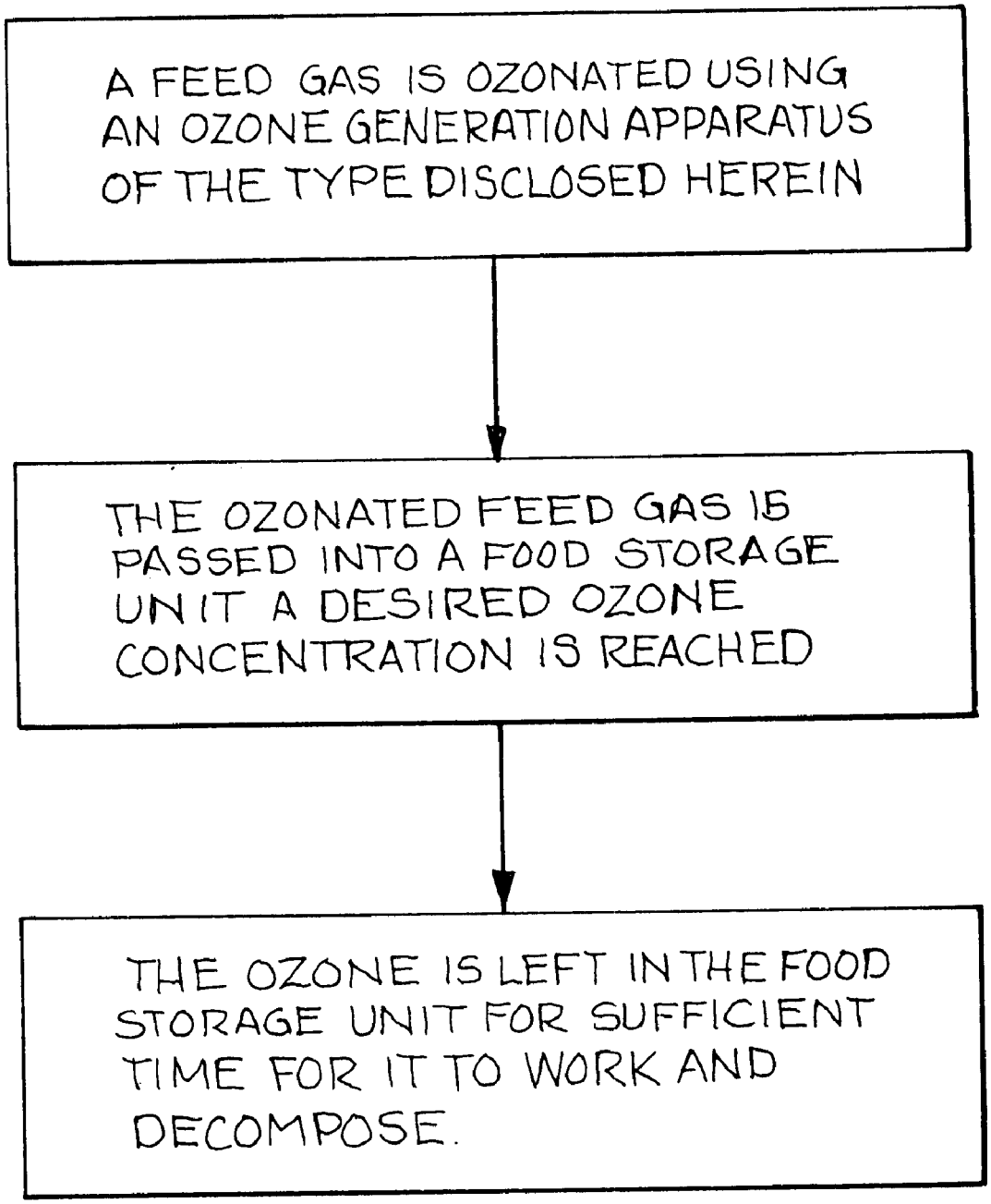
FIG. 13 is a flow chart showing the system and method of the present invention.

Referring now to FIG. 13, a flow chart of an embodiment of the system and method of the present invention is shown. The main steps of this embodiment include the ozonation of a feed gas, the placing of the feed gas into the food storage unit to be treated until a desired concentration is reached, and allowing sufficient time to pass for the ozone to work and to decompose. These individual steps are now explained in more detail.

Initially, air is passed through an ozone generation apparatus of the type described above. The next method step involves the passing of the ozonated feed gas into a substantially sealed food storage unit, until a desired ozone concentration is reached. The desired concentration of ozone in the food storage unit will depend on the type of food stored there, the particular microbes and/or spores that need to be targeted, the temperature in the food storage unit, and the humidity in the food storage unit. As discussed above, for example, the effective treatment of a potato storage facility generally requires the injection into the facility of sufficient ozone to achieve a concentration of eight parts per million. The final step is to maintain this exposure for sufficient time for the ozone to work and to decompose, making the food storage unit safe for entrance by persons. Again, using the example of a potato storage facility, it has been found that an eight parts per million concentration will dissipate after a period of approximately 20 minutes, allowing a person to thereafter safely enter the treated facility. Other foods may require different concentrations and different exposure times.

While the invention has been particularly shown and described with reference to preferred embodiments thereof, it will be understood by those skilled in the art that the foregoing and other changes in form and details may be made therein without departing from the spirit and scope of the invention.

I claim:

1. A system for preserving stored foods comprising, in combination:
   an apparatus for bombarding a feed gas with electrons to generate ozone and other atoms and molecules comprising:
      a first electrode;
      wherein said first electrode comprises:
         an electron gun coupled to a power source and located proximate one end of said first electrode;
         a rod in electrical communication with said electron gun;
         a first tube of dielectric material disposed along a length of said rod;
         a second tube of dielectric material dimensioned to receive therein said first tube;
         wherein said second tube is substantially sealed; and
         an inert gas disposed within each of said first tube and said second tube;
      a second electrode containing a channel dimensioned to receive therein said first electrode so that sufficient space is present between said first electrode and said second electrode that a feed gas may be passed through said channel along an exterior surface of said first electrode;
      a feed gas inlet coupled to said second electrode and wherein said feed gas inlet is in communication with said channel; and
      a feed gas outlet coupled at a first end thereof to said second electrode and wherein said feed gas outlet is in communication with said channel;
   means coupled to said feed gas outlet for transporting said feed gas to a food storage area.

2. The system of claim 1 wherein said power source is non-current limited.

3. The system of claim 1 wherein said electron gun further comprises a ceramic ring at an outlet portion thereof.

4. The system of claim 3 wherein said electron gun is a Philips TC series electron gun.

5. The system of claim 1 wherein said rod comprises aluminum.

6. The system of claim 1 wherein said rod comprises stainless steel.

7. The system of claim 1 wherein said rod comprises tungsten.

8. The system of claim 1 wherein said rod contacts said electron gun.

9. The system of claim 1 wherein a gap is present between said rod and said electron gun.

10. The system of claim 9 wherein said gap has a length of approximately one-half inch.

11. The system of claim 9 wherein said gap has a length of approximately one inch.

12. The system of claim 1 further comprising means for substantially centering said first tube.

13. The system of claim 12 wherein said means comprises an insulated cylinder disposed around a portion of said first tube.

14. The system of claim 12 wherein said means comprises mica fragments contacting each of said first tube and said second tube.

15. The system of claim 13 wherein said means further comprises mica fragments contacting each of said first tube and said second tube.

16. The system of claim 1 further comprising a shock absorbing material disposed below said rod at a bottom portion of said second tube.

17. The system of claim 16 wherein said shock absorbing material comprises fiberglass.

18. The system of claim 1 wherein said second electrode further comprises means for cooling said first electrode.

19. The system of claim 18 wherein said cooling means comprises:
   a substantially fluid-tight chamber formed in an interior portion of said second electrode so as to permit the passage of a coolant material about a side of said channel opposite a side of said channel exposed to a flow of said feed gas;
   a coolant inlet coupled to said fluid-tight chamber; and
   a coolant outlet coupled to said fluid-tight chamber.

20. The system of claim 1 wherein said first electrode further comprises a second electron gun coupled to a power source and located proximate a second end of said first electrode.

21. The system of claim 1 wherein said injector comprises a venturi-type of injector.

22. A system for preserving stored foods comprising, in combination:
   an apparatus for bombarding a feed gas with electrons to generate ozone and other atoms and molecules comprising:
      a first electrode comprising a substantially sealed tube of dielectric material;
      wherein said first electrode further comprises:
         a first electron gun coupled to a power source, located proximate one end of said first electrode, and adapted to fire electrons into said substantially sealed tube of dielectric material;
         a second electron gun coupled to a power source, located proximate a second end of said first electrode, and adapted to fire electrons into said substantially sealed tube of dielectric material; and
         an inert gas disposed within said substantially sealed tube of dielectric material;
      a second electrode containing a channel dimensioned to receive therein said first electrode so that sufficient space is present between said first electrode and said second electrode that a feed gas may be passed through said channel along an exterior surface of said first electrode;
      a feed gas inlet coupled to said second electrode and wherein said feed gas inlet is in communication with said channel; and
      a feed gas outlet coupled at a first end thereof to said second electrode and wherein said feed gas outlet is in communication with said channel; and
   means coupled to said feed gas outlet for transporting said feed gas to a food storage area.

23. A method for preserving stored foods comprising the steps of:
   providing an apparatus for bombarding a feed gas with electrons to generate ozone and other atoms and molecules comprising:
      a first electrode;
      wherein said first electrode comprises:
         an electron gun coupled to a power source and located proximate one end of said first electrode;
         a rod in electrical communication with said electron gun;
         a first tube of dielectric material disposed along a length of said rod;
         a second tube of dielectric material dimensioned to receive therein said first tube;
         wherein said second tube is substantially sealed; and
         an inert gas disposed within each of said first tube and said second tube;
      a second electrode containing a channel dimensioned to receive therein said first electrode so that sufficient space is present between said first electrode and said second electrode that a feed gas may be passed through said channel along an exterior surface of said first electrode;
      a feed gas inlet coupled to said second electrode and wherein said feed gas inlet is in communication with said channel; and
      a feed gas outlet coupled at a first end thereof to said second electrode and wherein said feed gas outlet is in communication with said channel;
   providing means coupled to said feed gas outlet for transporting said feed gas to a food storage area;
   providing power from said power source to said electron gun;
   passing a feed gas into said feed gas inlet, through said channel, and out of said feed gas outlet;
   transporting said feed gas through said means to said food storage area.

24. The method of claim 23 wherein said power source is non-current limited.

25. The method of claim 23 wherein said electron gun further comprises the step of providing a ceramic ring at an outlet portion thereof.

26. The method of claim 24 wherein said electron gun is a Philips TC series electron gun.

27. The method of claim 23 wherein said rod comprises aluminum.

28. The method of claim 23 wherein said rod comprises stainless steel.

29. The method of claim 23 wherein said rod comprises tungsten.

30. The method of claim 23 wherein said rod contacts said electron gun.

31. The method of claim 23 wherein a gap is present between said rod and said electron gun.

32. The method of claim 31 wherein said gap has a length of approximately one-half inch.

33. The method of claim 31 wherein said gap has a length of approximately one inch.

34. The method of claim 23 further comprising means for substantially centering said first tube.

35. The method of claim 34 wherein said means comprises an insulated cylinder disposed around a portion of said first tube.

36. The method of claim 34 wherein said means comprises mica fragments contacting each of said first tube and said second tube.

37. The method of claim 35 wherein said means further comprises mica fragments contacting each of said first tube and said second tube.

38. The method of claim 23 further comprising a shock absorbing material disposed below said rod at a bottom portion of said second tube.

39. The method of claim 38 wherein said shock absorbing material comprises fiberglass.

40. The method of claim 23 wherein said second electrode further comprises means for cooling said first electrode.

41. The method of claim 40 wherein said cooling means comprises:

a substantially fluid-tight chamber formed in an interior portion of said-second electrode so as to permit the passage of a coolant material about a side of said channel opposite a side of said channel exposed to a flow of said feed gas;

a coolant inlet coupled to said fluid-tight chamber; and a coolant outlet coupled to said fluid-tight chamber.

42. The method of claim 23 wherein said first electrode further comprises a second electron gun proximate a second end of said first electrode.

43. The method of claim 41 further comprising the step of providing a coolant into said coolant inlet at a temperature that will result in said coolant exiting said coolant outlet at a temperature is below approximately ninety degrees Fahrenheit.

44. The method of claim 41 further comprising the step of providing a coolant into said coolant inlet at a temperature that will result in said coolant exiting said coolant outlet at a temperature in the range of approximately eighty-five degrees Fahrenheit.

45. The method of claim 23 wherein said food storage area comprises a potato storage area.

46. The method of claim 45 further comprising the step of transporting a sufficient of said feed gas into said potato storage area so as to achieve in said potato storage area an ozone concentration of approximately eights parts per million.

* * * * *